US008043008B2

(12) United States Patent
Grehn

(10) Patent No.: US 8,043,008 B2
(45) Date of Patent: Oct. 25, 2011

(54) ROLLING-ELEMENT BEARING UNIT

(75) Inventor: Martin Grehn, Dittelbrunn (DE)

(73) Assignee: Schaeffler KG, Herzogenaurach (DE)

( * ) Notice: Subject to any disclaimer, the term of this patent is extended or adjusted under 35 U.S.C. 154(b) by 422 days.

(21) Appl. No.: 12/439,185

(22) PCT Filed: Aug. 25, 2007

(86) PCT No.: PCT/DE2007/001520
§ 371 (c)(1),
(2), (4) Date: Feb. 27, 2009

(87) PCT Pub. No.: WO2008/025336
PCT Pub. Date: Mar. 6, 2008

(65) Prior Publication Data
US 2010/0008612 A1 Jan. 14, 2010

(30) Foreign Application Priority Data
Aug. 31, 2006 (DE) .......................... 10 2006 040 777

(51) Int. Cl.
*F16C 23/10* (2006.01)
(52) U.S. Cl. ....................................... 384/447; 384/461
(58) Field of Classification Search .................. 384/447, 384/460, 495–498, 461
See application file for complete search history.

(56) References Cited

U.S. PATENT DOCUMENTS

| 2,691,553 | A | * | 10/1954 | Pettigrew ...................... 384/447 |
| 2,822,225 | A | * | 2/1958 | Teufel ........................... 384/461 |
| 4,035,044 | A | * | 7/1977 | Miyazaki ....................... 384/447 |
| 4,159,152 | A | | 6/1979 | Bjork |
| 4,834,560 | A | * | 5/1989 | Jacob et al. .................... 384/461 |
| 5,234,270 | A | * | 8/1993 | Mathes .......................... 384/461 |
| 5,632,560 | A | * | 5/1997 | Dittenhofer .................... 384/447 |
| 5,639,166 | A | * | 6/1997 | Dittenhofer .................... 384/461 |
| 6,132,098 | A | * | 10/2000 | Zylla ............................. 384/461 |

FOREIGN PATENT DOCUMENTS

| DE | 12 92 956 B | 4/1969 |
| DE | 20 25 919 A1 | 12/1970 |
| DE | 27 27 264 A1 | 12/1977 |
| DE | 78 38 064 U1 | 4/1979 |
| DE | 28 32 457 A1 | 2/1980 |
| DE | 30 49 080 Y | 7/1982 |
| DE | 88 01 758 U1 | 5/1988 |
| DE | 202 10 228 Y | 11/2003 |
| DE | 10 2005 044 956 A1 | 3/2007 |
| WO | 2007/033844 P | 3/2007 |

* cited by examiner

*Primary Examiner* — Thomas R Hannon
(74) *Attorney, Agent, or Firm* — Lucas & Mercanti, LLP

(57) ABSTRACT

The invention relates to a rolling-element bearing unit for rotatably bearing two components, nested into each other, which rotate about separate rotational axes that are at an angle to each other, especially the roll core and roll sleeve of a width stretching roll for a paper machine. The rolling-element bearing unit according to the invention comprises an outer rolling-element bearing for rotationally bearing the outer component, a pivoting bearing carrying the outer rolling-element bearing and allowing adjustment of the angle of the outer rolling-element bearing, an angularly adjustable inner rolling-element bearing for rotationally bearing the inner component, and an eccentric which consist of an inner and an outer eccentric ring via which eccentric rings the centers of the two rolling-element bearings can be adjusted in relation to each other.

5 Claims, 6 Drawing Sheets

ROLLING-ELEMENT BEARING UNIT

FIELD OF THE INVENTION

The invention relates to a rolling-element bearing unit for the rotary mounting of two components, in particular the roll core and roll casing of the width-stretching roll for a paper machine, which are arranged one in the other and which are rotatable about separate axes of rotation standing at an angle to one another.

BACKGROUND OF THE INVENTION

It is sometimes necessary for two rotatable components, which are arranged one in the other, to be rotationally mounted separately. One example of this is a novel width-stretching roll for paper machines. In such a width-stretching roll, two rolls, an inner roll core and an outer roll casing, are arranged one in the other and are flexed elastically with respect to one another. The outer roll, that is to say the roll casing, is the actual working roll which rolls on the paper web, and the inner roll, the roll core, is the supporting roll.

Each roll is mounted independently in rolling-element bearings. The center points of the rolling-element bearings are eccentrically adjusted differently between 0 and a maximum spacing. The rolls are thereby flexed elastically to a greater or lesser extent. Such a wide stretching roll has previously been mounted, using two separate standard rolling-element bearings having corresponding conversion parts, in order to allow both the separate mounting of the two rolls and their relative adjustment with respect to one another. The conversion parts have to be specially made for this purpose, the outlay in terms of parts is inevitably high, the supply of lubricant is complicated, and this design requires a relatively large set-up and consequently takes up a large amount of space.

SUMMARY OF THE INVENTION

The problem on which the invention is based is, therefore, to specify a possibility for the simple and compact mounting of two such components, in particular the two rolls of a width-stretching roll.

To solve this problem, according to the invention, a rolling-element bearing unit is provided, comprising the following integrated elements: an outer rolling-element bearing for the rotary mounting of the outer component, a pivot bearing which allows the angular adjustment of the outer rolling-element bearing and which carries the outer rolling-element bearing, an angularly adjustable inner rolling-element bearing for the rotary mounting of the inner component, and an eccentric, consisting of an inner and of an outer eccentric ring, via which eccentric rings the center points of the two rolling-element bearings can be adjusted in relation to one another.

In the rolling-element bearing unit according to the invention, three separate bearings are combined into one integrated functional or structural unit. An outer rolling-element bearing serves for the rotary mounting of the outer component, that is to say, here, the roll casing, this outer rolling-element bearing being angularly adjustable via a pivot bearing following the latter when viewed radially inwardly, in order to ensure the required angular adjustment which is necessary for the elastic flexure of the roll with respect to its longitudinal axis. Furthermore, in turn lying radially further inward, an angularly adjustable inner rolling-element bearing is provided, which serves for the rotary mounting of the inner component, that is to say, here, the roll core. This rolling-element bearing, too, is angularly adjustable, in order, here too, to allow angular adaption for the elastic deformation of the roll core with respect to its longitudinal axis. This elastic deformation of the two components or roll parts is made possible in that the structural unit has an eccentric consisting of an inner and of an outer eccentric ring. This eccentric is integrated into the rolling-element bearing unit in such a way that the two center points of the two rolling-element bearings, that is to say of the outer and of the inner rolling-element bearing, can be adjusted in relation to one another. As a result of a corresponding adjustment of the eccentric rings, the flexion and also the position of the flexion in space can consequently be set.

The rolling-element bearing unit according to the invention is a compact element which combines within it all the required functions, to be precise the rotary mounting, angular adjustment and eccentric adjustment. Further components are no longer required in order to mount the components to be mounted, that is to say, for example, the two rolls, in the necessary way. A lubrication of the rolling-element bearings is readily possible after these are arranged one in the other. Furthermore, the rolling-element bearing unit according to the invention has a relatively small build, and therefore the space requirement is likewise relatively low.

Two basic embodiments of the rolling-element bearing unit according to the invention, to be precise a 5-ring bearing unit and a 4-ring bearing unit, may be envisioned.

In the 5-ring bearing unit, the outside of the outer eccentric ring and the inside of an inner ring of the outer rolling-element bearing are profiled in the form of a spherical segment in order to form the pivot bearing, and they engage one in the other. This bearing unit consists overall of five rings, to be precise the outer ring and the inner ring of the outer rolling-element bearing, the outer eccentric ring and the inner eccentric ring, which at the same time form the outer ring or the running surface for the inner rolling-element bearing, and the inner ring of the inner rolling-element bearing. In this configuration of the invention, the inside of the inner ring of the outer rolling-element bearing and the outside of the outer eccentric ring are profiled in the form of a spherical segment, the inner-ring inside being in this case hollow-spherical and the outside being spherical, and the two engage one in the other and form the pivot bearing which allows a tilting of the outer rolling-element bearing in relation to the inner rolling-element bearing about an axis perpendicular to the axis of rotation. It would, of course, also be conceivable to configure the form of the pivot bearing conversely, that is to say the inside of the inner ring of the outer rolling-element bearing as a spherical profile and the outside of the outer eccentric ring as a hollow-spherical profile.

By contrast, the 4-ring bearing unit consists of the outer ring of the outer rolling-element bearing, and the outer eccentric ring, which at the same time forms the inner ring or the running surface for the rolling elements of the outer rolling-element bearing; of the inner eccentric ring, which, here too, forms the outer ring or the running surface of the inner rolling-element bearing; and of the inner ring of the inner rolling-element bearing. In this alternative, the pivot bearing is formed between the two eccentric rings. For this purpose, the inside of the outer eccentric ring and the outside of the inner eccentric ring are profiled in the form of a spherical segment in order to form the pivot bearing, and they engage one in the other. For example, here too, the inner surface of the outer eccentric ring may be profiled hollow-spherically, while the outside of the inner eccentric ring is profiled as a sphere. Here, therefore, the separate inner ring of the outer rolling-element bearing is dispensed with, its function being assumed by the outer eccentric ring. Whereas this rolling-element bearing unit therefore manages with only 4 rings, the 5-ring rolling-element bearing unit is distinguished in that it can be produced from two separately mountable units. Thus, in this version, the inner rolling-element bearing can be preassembled with the inner eccentric ring as one component, and the outer rolling-element bearing can be preassembled with the pivot bearing, that is to say containing the outer eccentric ring, as the second component. Subsequently, it is merely necessary to place the two eccentric rings one in the other.

The outer rolling-element bearing is expediently a rolling-element bearing designed for high rotational speeds, in particular a two-row cylindrical roller bearing. The rotational speed of this rolling-element bearing is relatively high. This is because, as described, the outer rolling-element bearing has fastened to it the roll casing which rolls directly on the paper web which is drawn through beneath it and via which the entire roll arrangement is rotated. As a result of the relatively high conveying speed of the paper, in conjunction with the bearing diameter, a considerable rotational speed is obtained, with respect to which the bearing has to be designed. A two-row cylindrical roller bearing is appropriate here, which, on the one hand, is designed for such high rotational speeds and, on the other hand, also has a sufficient load-bearing capacity. Instead of a two-row cylindrical roller bearing, however, basically any other type of bearing construction, for example single-row cylindrical roller bearings or single-row or multirow ball bearings, may be used as an outer rolling-element bearing. The bearing used as an outer rolling-element bearing determines, moreover, whether the bearing unit can be used as a fixed bearing (then with collars on the outer rolling-element bearing) or as a loose bearing (without collars, hence an axial movability of the rolling elements).

The inner rolling-element bearing is expediently designed as a self-aligning roller bearing which are innately angularly adjustable. In such a self-aligning roller bearing, the outer ring has a hollow-spherical profiling, while two running surfaces standing at an angle to one another and likewise having a slightly hollow-spherical profile are provided on the inner ring. The two rows of rolling elements are therefore at an angle to one another.

As a result of the hollow-spherical profiling of the outer running surface, it is then possible to adjust the inner ring, together with the rolling elements, in relation to the outer ring.

Furthermore, the inner rolling-element bearing assumes a sliding function, for example when used for mounting a width-stretching roll. When the roll is flexed, length compensation must be possible here. For this purpose, the inner bearing bore has a sliding fit. Furthermore, a groove for receiving a feather key arranged on the shaft must be provided in order to allow the rotational movement or take-along.

BRIEF DESCRIPTION OF THE DRAWINGS

Further advantages and details of the invention may be gathered from the exemplary embodiments described below and with reference to the drawings in which.

DETAILED DESCRIPTION OF THE DRAWINGS

Figure 1:
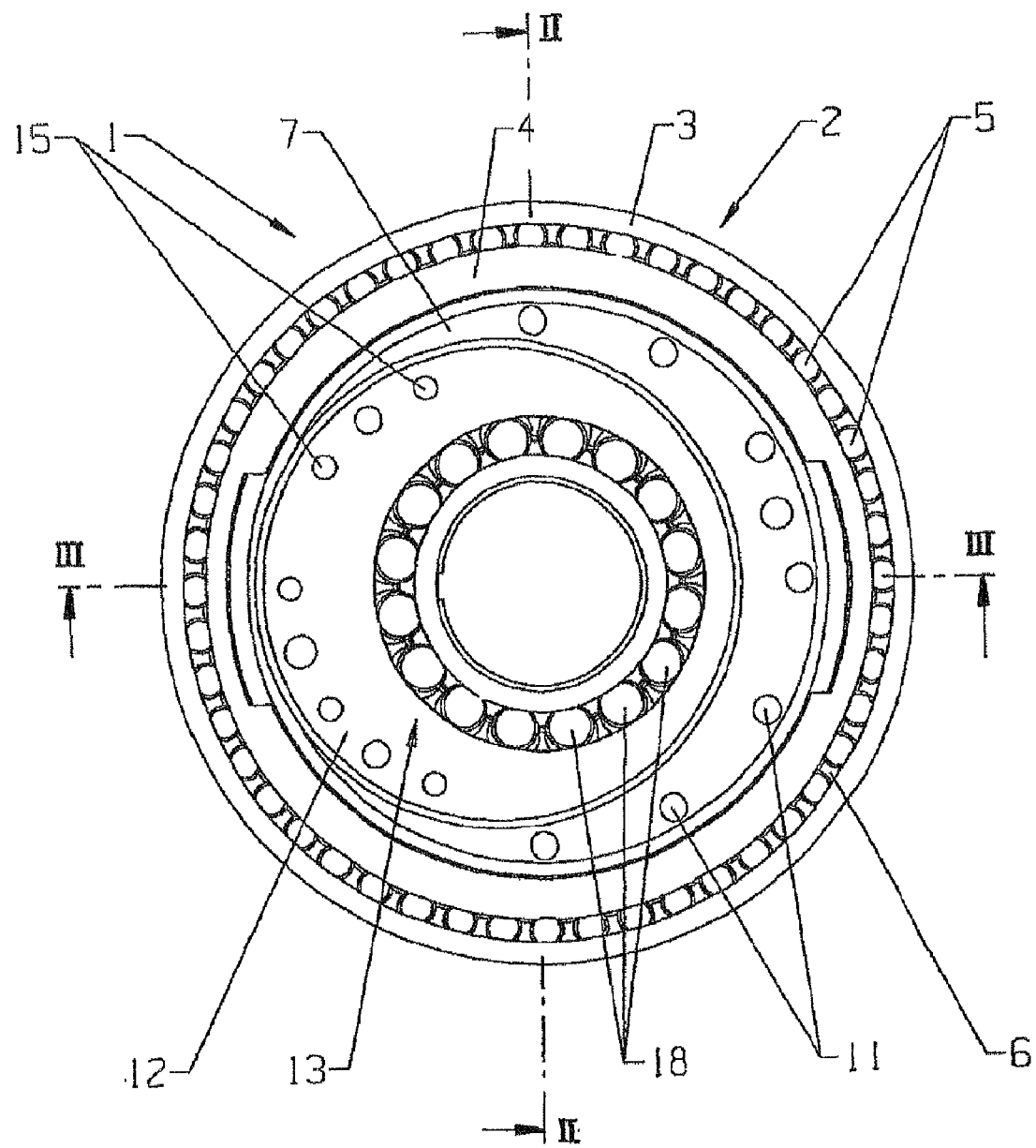
FIG. 1 shows a side view of a rolling-element bearing unit according to the invention as a 5-ring bearing unit.

FIG. 1 shows a rolling-element bearing unit 1 according to the invention in a first embodiment, comprising an outer rolling-element bearing 2 consisting of an outer ring 3, of an inner ring 4 and of a plurality of rolling elements 5 which run on the running surfaces of these two rings and which are held in a cage 6, in the exemplary embodiment shown two rolling-element rows being provided, this therefore being a double-row cylindrical roller bearing.

The inner ring 4 is followed radially inward by an outer eccentric ring 7. The inner ring 4 and the outer eccentric ring 7 together form a pivot bearing 8. For this purpose, the inner surface 9 of the inner ring 4 has a hollow-spherical profiling, the outer surface 10 of the outer eccentric ring 7 correspondingly having a fully spherical profiling, that is to say a complementary outer profile. The two engage one in the other, so that the outer rolling-element bearing 2 can consequently be tilted in relation to the outer eccentric ring 7 and to the elements installed in it about an axis perpendicular to the axis of rotation.

On the outer eccentric ring 7, a number of fastening bores 11 are provided, by means of which the outer eccentric ring is to be flanged to a counterflange, which, in turn, is mounted rotationally on a machine stand, when the rolling-element bearing unit is mounted.

The outer eccentric ring 7 is followed by an inner eccentric ring 12 which, in the exemplary embodiment shown, is somewhat narrower than the outer eccentric ring. The inner eccentric ring 12 forms at the same time the outer ring for an inner rolling-element bearing 13 which is designed as a self-aligning roller bearing. For this purpose, the inside 14 of the inner eccentric ring 12 which likewise has a number of fastening bores 15, via which it can likewise be flanged to another counterflange of a machine stand, has a hollow-spherical profiling. The inner rolling-element bearing 13 comprises an inner ring 16 which has two running surfaces 17 which stand at an angle to one another and on which the rolling elements 18, which then necessarily stand at an angle to one another, run. As a result of the hollow-spherical profiling of the inner wall 14 of the inner eccentric ring, an angular adjustment of the inner ring in relation to the outer ring, that is to say, here, to the inner eccentric ring 12, is possible, as is known in self-aligning roller bearings.

In this 5-ring version of the rolling-element bearing unit according to the invention, there is the possibility of initially prefabricating this in the form of two separate subassemblies. The outer rolling-element bearing, together with the outer eccentric ring, is manufactured as one subassembly, and the inner rolling-element bearing together with the inner eccentric ring is manufactured as the second subassembly. The two eccentric rings 7, 12 are designed cylindrically on their surfaces lying opposite one another, so that the two subassemblies can be placed one in the other.

Figure 4:
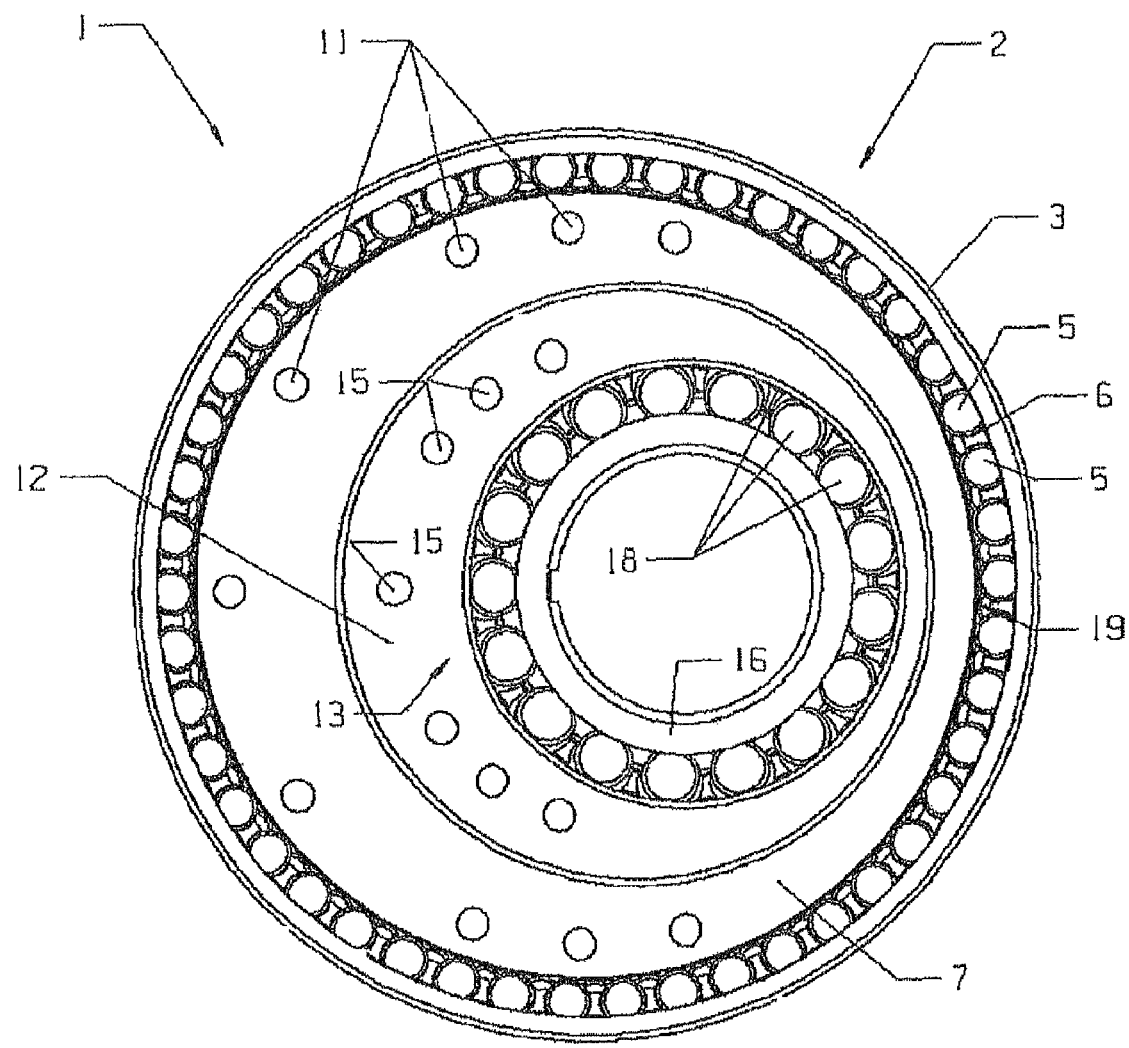
FIG. 4 shows a side view of a 4-ring rolling-element bearing unit according to the invention.

A further embodiment according to the invention of a rolling-element bearing unit 1 is shown in FIG. 4, the same reference symbols being used here for the same components. This, too, shows an outer rolling-element bearing 2 with an outer ring 3 and with a plurality of rolling elements 5 guided in a cage 6. Here, however, a separate inner ring is not provided, but, instead, the inner ring or the opposite running surface for the rolling elements 5 is formed by the outer eccentric ring 7 or its outer surface 19. The two rolling-element rows therefore run on the outer surface 19 of the outer eccentric ring 7.

This outer eccentric ring 7 likewise has the plurality of fastening bores 11, via which it is fastened to a bearing counterflange, which, in turn, is rotationally mounted on a machine stand, in which, for example, the width-stretching roller is rotatably held.

Here, too, the outer eccentric ring 7 is followed by the inner eccentric ring 12. Contrary to the embodiment according to FIGS. 1-3, in which those surfaces of the two eccentric rings 7, 12 which lie opposite one another are cylindrical, in this embodiment the two eccentric rings 7, 12 form the pivot bearing 8. For this purpose, the inside 20 of the outer eccentric ring 7 has a hollow-spherical profiling, while the outer surface 21 of the inner eccentric ring 12 has a spherical profiling. The two engage one in the other and thus make it possible to form a pivot bearing 8 which allows an angular adjustment of the outer rolling-element bearing 2 in relation to the inner rolling-element bearing 13. Even though, here, the outer eccentric ring 7 is adjusted angularly in relation to the inner eccentric ring 12, these can, as before, be adjusted eccentrically in relation to one another, so that, in use with a width-stretching roll, the adjustment of the axis of rotation is readily possible. The inner ring 12, too, has here the plurality of bores 15 for fastening to a counterflange, which counterflange, again, is rotationally mounted, as described, on a machine stand, but separately from the first counterflange.

Figure 2:
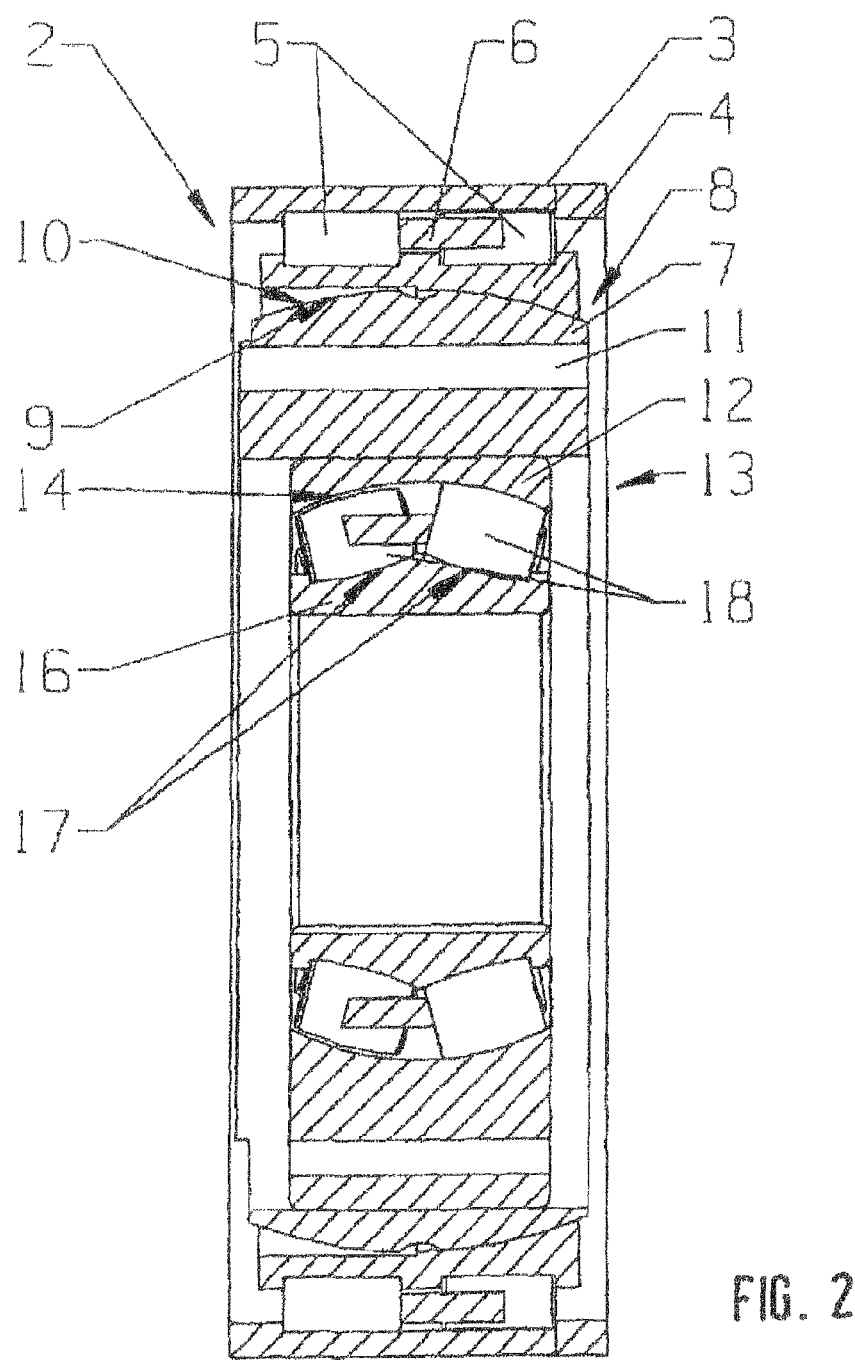
FIG. 2 shows a sectional view through the rolling-element bearing unit from FIG. 1 along the line II-II.
Figure 3:
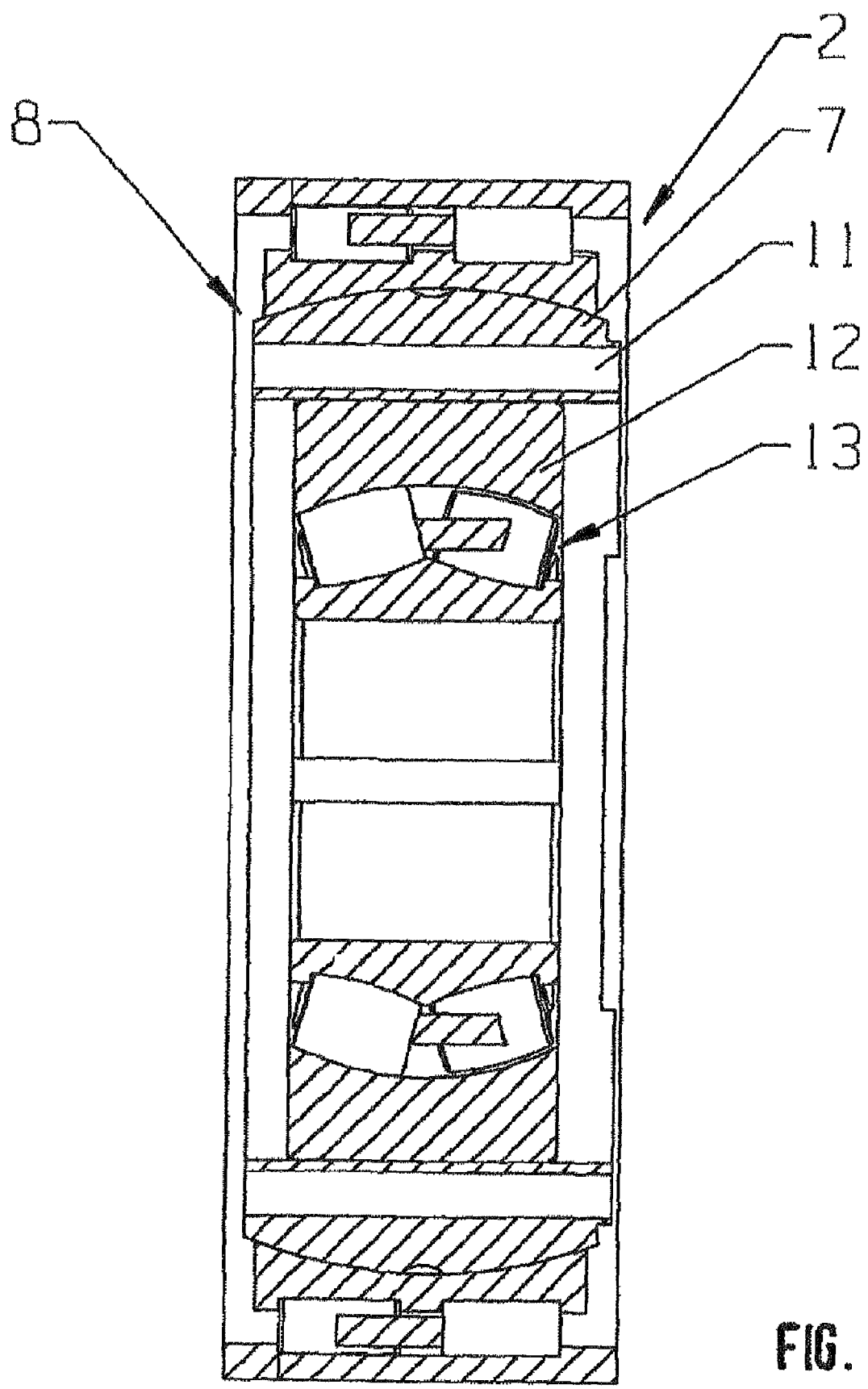
FIG. 3 shows a sectional view through the rolling-element bearing unit from FIG. 1 along the line III-III.

As in the embodiment according to FIGS. 1-3, too, the inner eccentric ring 12 is followed by the inner rolling-element bearing 13, the inner eccentric ring forming the outer ring or the outer running surface for the rolling elements 18 of the inner rolling-element bearing 13 designed as a self-aligning roller bearing. Here, too, the inner surface 14 of the inner eccentric ring has a hollow-spherical profiling, and, correspondingly, the two running surfaces 17, standing at an angle to one another, for the rolling elements 18 are provided on the inner ring 16.

As is clear, the two rolling-element bearing units have a very compact build and require only a very small amount of space. The angular adjustability of the two rolling-element bearings, that is to say of the outer rolling-element bearing 2 and of the inner rolling-element bearing 13, is mutually independent. Also, a continuous adjustability of the eccentricity between the outer and the inner rolling-element bearing 2, 13 via the two freely adjustable eccentric rings is possible. Furthermore, these, with their corresponding patterns of bores, allow a simple mounting of the rolling-element bearing unit, and, as described, both are flanged to correspondingly rotatably mounted counterflanges. Furthermore, a simple separate lubrication of the two rolling-element bearings is also possible.

Figure 5:
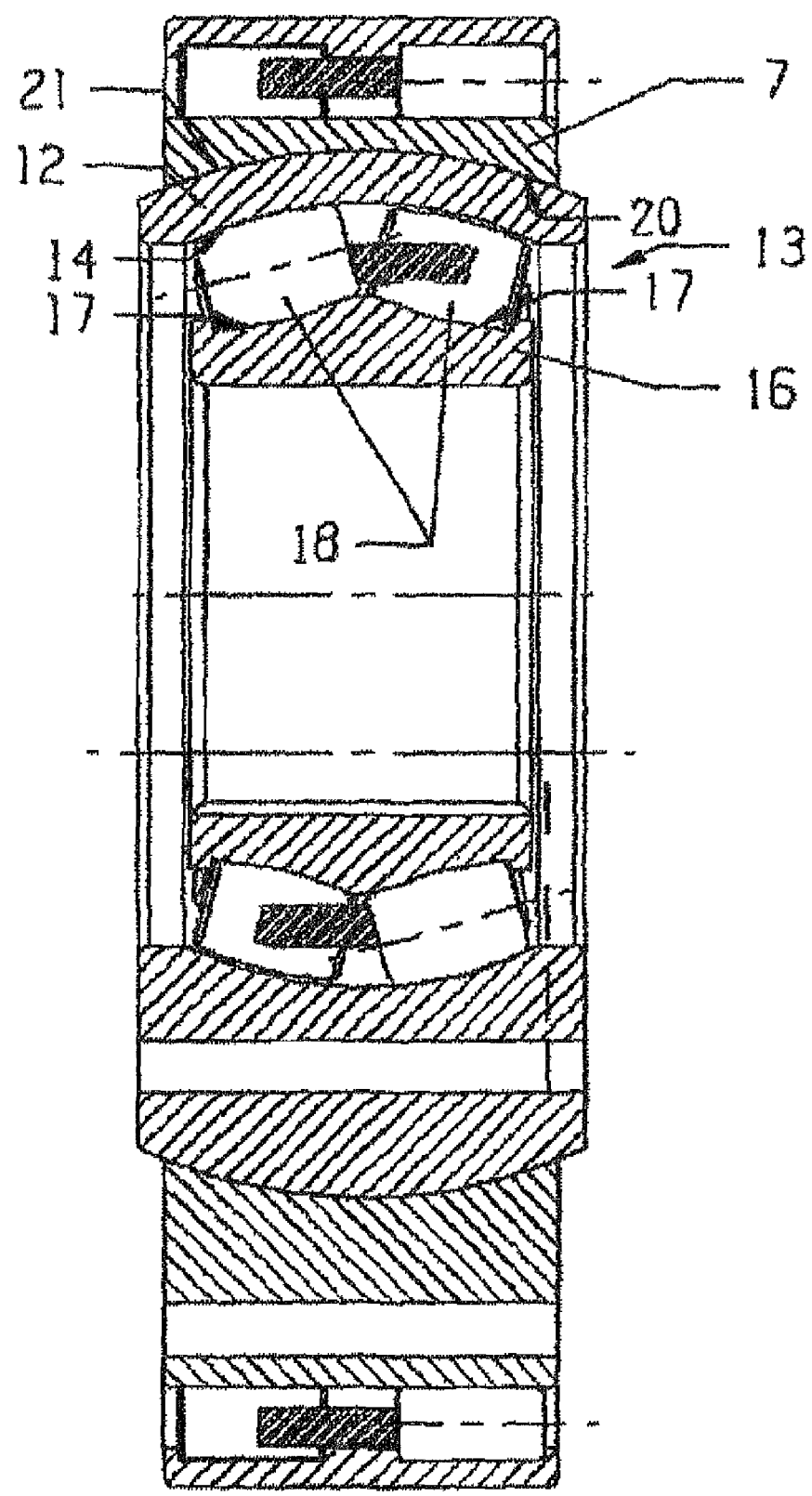
FIG. 5 shows a sectional view through the rolling-element bearing unit from FIG. 4 along the line V-V.
Figure 6:
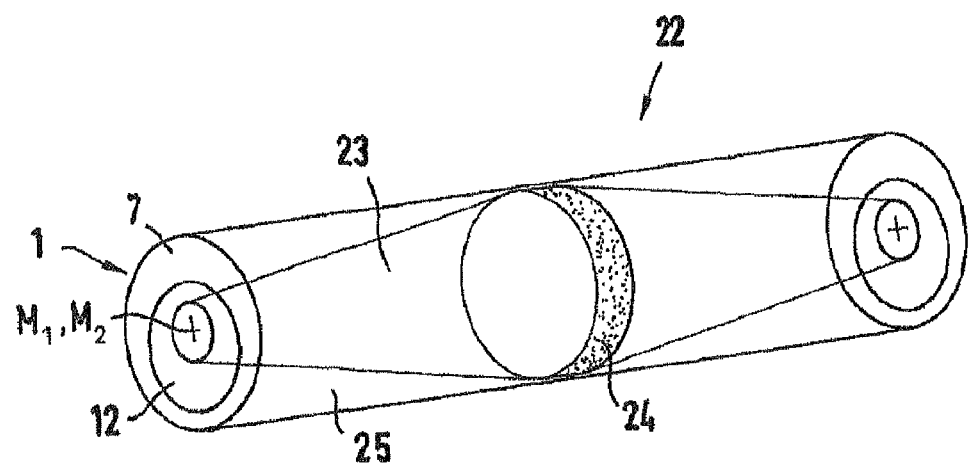
FIG. 6 shows a schematic diagram of the situation where two rolling-element bearing units are mounted on a width-stretching roll, the rolling-element bearing units being unadjusted.
Figure 7:
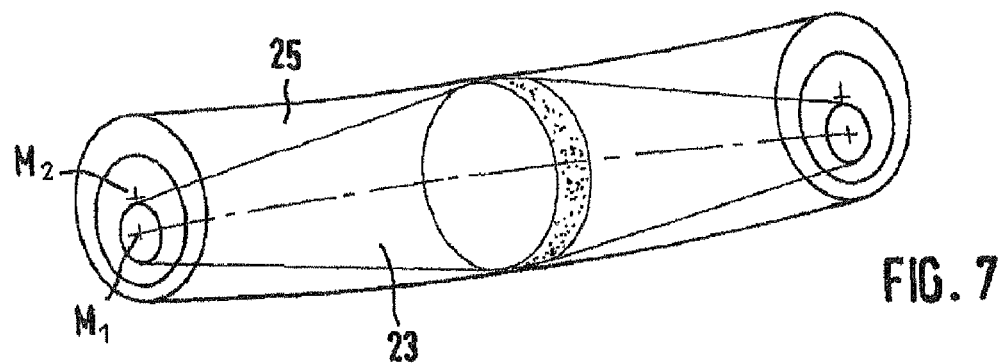
FIG. 7 shows the arrangement according to FIG. 6 with adjusted rolling-element bearing units.

FIGS. 6 and 7 show an example of the use of rolling-element bearing units according to the invention, irrespective of whether it is now a 5-ring version according to FIG. 1-3 or a 4-ring version according to FIGS. 4, 5. FIGS. 6 and 7 are merely schematic diagrams intended to explain the fundamental operating principle.

A width-stretching roll 22 is shown, consisting of an inner roll core 23 which is implemented here in the form of two cone frusta diverging from one another. This roll core 23 is flexible and consists, for example, of fiber-reinforced plastic. It is glued, and therefore firmly connected, in the middle via an adhesive joint 24 to the roll casing 25 which likewise consists, for example, of fiber-reinforced plastic.

The two ends of the inner roll core are received in the inner ring 16 of the inner rolling-element bearing of the rolling-element bearing unit 1, that is to say the roll core 23 is rotationally mounted via the inner rolling-element bearing. The outer roll casing 25 is fastened to the outer ring 3 of the outer rolling-element bearing, that is to say is rotationally mounted via the outer rolling-element bearing. FIGS. 6 and 7 do not illustrate the individual rolling-element bearings in detail, but merely the outer eccentric ring 7 and the inner eccentric ring 12 which are essential for describing the flexing function.

As described, the two eccentric rings 7, 12 are flanged in each case to separate counterflanges, that is to say the rolling-element bearing units lying opposite one another are secured via the two eccentric rings in relation to a machine stand, not shown in any more detail. The two counterflanges themselves, in turn, are rotationally mounted on the machine stand in corresponding rolling-element bearings, this being necessary so that the two eccentric rings 7, 12 can be adjusted in relation to one another. In this case, the outer eccentric ring bears the roll force during operation.

FIG. 6 shows the basic state in which the two eccentric rings 7, 12 are positioned such that the two center points M1, M2 of the two rolling-element bearings 2, 13 lie one in the other, that is to say the two axes of rotation of the roll core 23 and the roll casing 25 fall one in the other.

If, then, in the example shown, the inner eccentric ring is rotated a maximum of 180° out of the position according to FIG. 6 into the position according to FIG. 7, the two center points fall apart from one another. Whereas the center point M2 of the outer rolling-element bearing remains in the original position, the center point M1 moves downward in the exemplary embodiment shown as a result of the eccentric adjustment. The result of this is that the roll core 23, which is mounted in the inner rolling-element bearing 13, is taken along. As described, the roll core 23 is connected to the roll casing 25 via the adhesive joint 24, however. The result of this is that, since the outer eccentric ring 7 carrying the outer rolling-element bearing 2 carrying the roll casing 25 is connected fixedly in position to the machine stand, the roll casing 25 is necessarily flexed, as illustrated in FIG. 7. The outer roll casing 25 constitutes resistance, the result of this being that the roll core 23 is also ultimately flexed somewhat, but the roll core 23 is flexed in the opposite direction to the roll casing 25. As a result of the rotation of the inner eccentric ring out of the middle position by 180°, the maximum roll flexion can be set.

If, then, the relative position of the flexion, as has been achieved by the adjustment of the inner eccentric ring, is to be changed in space, this takes place by the rotation of the outer eccentric ring 7. The latter can be brought into any desired position, in which case, since the inner eccentric ring, together with the inner rolling-element bearing, is always taken along, the set roll flexion or the degree of flexion is maintained, only the position in space being changed.

In the installation situation, the flexed width-stretching roll 22 lies on the paper web which is drawn through beneath it, via which the roll rotation takes place, that is to say the width-stretching roll 22 is not itself driven actively. Due to the curved roll shape, the paper web is stretched in width by virtue of the outwardly acting speed vector, and creases are smoothed out. In the width-stretching roll 22 of the type described, then, due to the integration of the two separate rolls in the form of the roll core 23 and of the roll casing 25 and their production from flexible material, for example carbon fiber, there is the possibility that the degree of flexion of the roll can be set as desired between zero and a maximum. The rolling-element bearing unit according to the invention affords the possibility, then, that both the rotating roll casing 25 and the rotating roll core can be mounted in a common structural unit, while at the same time there is the possibility of an opposite tilting of the two separate mountings (of the outer rolling-element bearing 2 and of the inner rolling-element bearing 13), and also the possibility afforded for setting the roll flexion and the spatial position of flexion via the two eccentric rings.

LIST OF REFERENCE SYMBOLS

1 Rolling-element bearing unit
2 Outer rolling-element bearing
3 Outer ring
4 Inner ring
5 Rolling-element bearing element
6 Cage
7 Eccentric ring
8 Pivot bearing
9 Inner surface of the inner ring
10 Outer surface of the outer eccentric ring
11 Fastening bores
12 Eccentric ring
13 Inner rolling-element bearing
14 Inside of the inner eccentric ring
15 Fastening bores
16 Inner ring
17 Running surfaces
18 Rolling element
19 Outer surface
20 Inside of the outer eccentric ring
21 Outer surface of the inner eccentric ring
22 Width-stretching roll
23 Inner roll core
24 Adhesive joint
25 Roll casing
M1 Center point
M2 Center point

The invention claimed is:

1. A rolling-element bearing unit for a rotary mounting of two components, a roll core and a roll casing of a width-stretching roll for a paper machine, which are arranged one in the other and are rotatable about separate axes of rotation standing at a angle to one another, comprising:
 an outer rolling-element bearing for the rotary mounting of an outer component,
 a pivot bearing which allows angular adjustment of the outer rolling-element bearing and which carries the outer rolling-element bearing,
 an angularly adjustable inner rolling-element bearing for the rotary mounting of an inner component, and
 an eccentric, consisting of an inner eccentric ring and of an outer eccentric ring, via which eccentric rings center points of the outer rolling-element bearing and the inner-rolling element bearing can be adjusted in relation to one another.

2. The rolling-element bearing unit as claimed in claim 1, wherein an outside of the outer eccentric ring and an inside of an inner ring of the outer rolling-element bearing are profiled as a spherical segment so as to form the pivot bearing and engage one in the other.

3. The rolling-element bearing unit as claimed in claim 1, wherein an inside of the outer eccentric ring and an outside of the inner eccentric ring are profiled as a spherical segment so as to form the pivot bearing and engage one in the other.

4. The rolling-element bearing unit as claimed in claim 1, wherein the outer rolling-element bearing is a two-row cylindrical roller bearing.

5. The rolling-element bearing unit as claimed in claim 1, wherein the inner rolling-element bearing is a self-aligning roller bearing.

* * * * *